(12) United States Patent
Frank et al.

(10) Patent No.: US 6,738,934 B2
(45) Date of Patent: May 18, 2004

(54) ON-CHIP WATCHDOG CIRCUIT

(75) Inventors: Paul Andrew Frank, Albany, NY (US); Daniel Arthur Staver, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 399 days.

(21) Appl. No.: 09/774,167

(22) Filed: Jan. 29, 2001

(65) Prior Publication Data
US 2002/0104048 A1 Aug. 1, 2002

(51) Int. Cl.[7] .................................................. G06F 11/00
(52) U.S. Cl. ............................. 714/51; 714/55; 327/20
(58) Field of Search ........................ 714/51, 55; 327/20

(56) References Cited

U.S. PATENT DOCUMENTS

| | | | | | |
|---|---|---|---|---|---|
| 4,964,011 A | * | 10/1990 | Sternglass | ................... | 361/88 |
| 5,081,625 A | * | 1/1992 | Rhee et al. | ................... | 714/55 |
| 5,649,098 A | * | 7/1997 | Shieh et al. | ................... | 714/55 |
| 5,910,739 A | * | 6/1999 | Stanojevic | ................... | 327/143 |
| 6,393,589 B1 | * | 5/2002 | Smit et al. | ................... | 714/55 |
| 6,563,319 B1 | * | 5/2003 | Kraz | ................... | 324/458 |

* cited by examiner

Primary Examiner—Scott Baderman
Assistant Examiner—Joshua Lohn
(74) Attorney, Agent, or Firm—Jean K. Testa; Christian G. Cabou

(57) ABSTRACT

An on-chip watchdog circuit (100) is provided that generates an output signal (175) when an error signal (112) generated by a circuit under test (110) is detected. The on-chip watchdog circuit (100) comprises a logic gate (125) that is connected to a clock signal and receives a signal in response to the error signal 112 generated by the circuit under test (110). A gate output circuit (140) is connected to an output of the logic gate (125). An RC circuit (150) is connected to the gate output circuit (140). A comparator (170) is connected to the RC circuit (150). The comparator (170) is also connected to a voltage divider (160) and provides the output signal (175) in response to the error signal (112) generated by the circuit under test (110), and the on-chip watchdog circuit (100) and the circuit under test (110) are integrated on a same semiconductor microchip.

22 Claims, 2 Drawing Sheets

ON-CHIP WATCHDOG CIRCUIT

BACKGROUND OF THE INVENTION

A common feature in conventional micro-controllers and microprocessors is a watchdog function circuit. Typically, the watchdog function circuit includes circuitry that monitors error signals from various self-testing functions of the micro-controller or microprocessor. The self-testing functions can include, for example, a counter overflow bit, a checksum discrepancy computational bit or other test function. The watchdog function circuit provides an enable signal that is actively updated based on the completion of the various self-testing functions of the micro-controller or microprocessor. If one or more of the self-testing functions fail, the enable signal from the watchdog function circuit is required to change state in a fail-safe manner.

Typically, conventional micro-controllers and microprocessors implement the watchdog function circuit by allowing the setting of time constants that correspond to the update rate of the self-testing function of the micro-controller or microprocessor. The time constants for the update rates of the self-testing function require large capacitance values, and the capacitors required for the large capacitance values are not economically formed into integrated circuits on a semiconductor microchip. Therefore, conventional micro-controller and microprocessor must implement the watchdog function circuit via circuitry that is not integrated onto a semiconductor microchip. As such, typical watchdog function circuits are implemented externally from the micro-controller or microprocessor. As a result, these external watchdog function circuits increase the cost of micro-controller and/or microprocessor systems because the watchdog function cannot be economically formed as a integrated circuit on a semiconductor microchip.

Therefore, it is desired to provide a watchdog function circuit that can be formed as an integrated circuit on a semiconductor microchip. It is further desired to provide a watchdog function circuit that is integrated on the same semiconductor microchip as the micro-controller and/or microprocessor such that production costs and complexity involved in producing these systems can be reduced.

BRIEF SUMMARY OF THE INVENTION

In one representative embodiment, an on-chip watchdog circuit provides an output signal when an error signal that is generated by a circuit under test is detected. The on-chip watchdog circuit comprises a clock signal generator that generates a clock signal. A NOR gate is connected to the clock signal generator, and the NOR gate receives the clock signal and the error signal generated by the circuit under test. A gate output circuit is connected to an output of the NOR gate. A capacitor is connected between the gate output circuit and ground. A resistor is connected between the capacitor and ground. A comparator is connected to the resistor. The comparator is also connected to a voltage divider. The comparator provides the output signal in response to the error signal generated by the circuit under test. The on-chip watchdog circuit and the circuit under test are integrated on a semiconductor microchip.

DETAILED DESCRIPTION OF THE INVENTION

Figure 1:
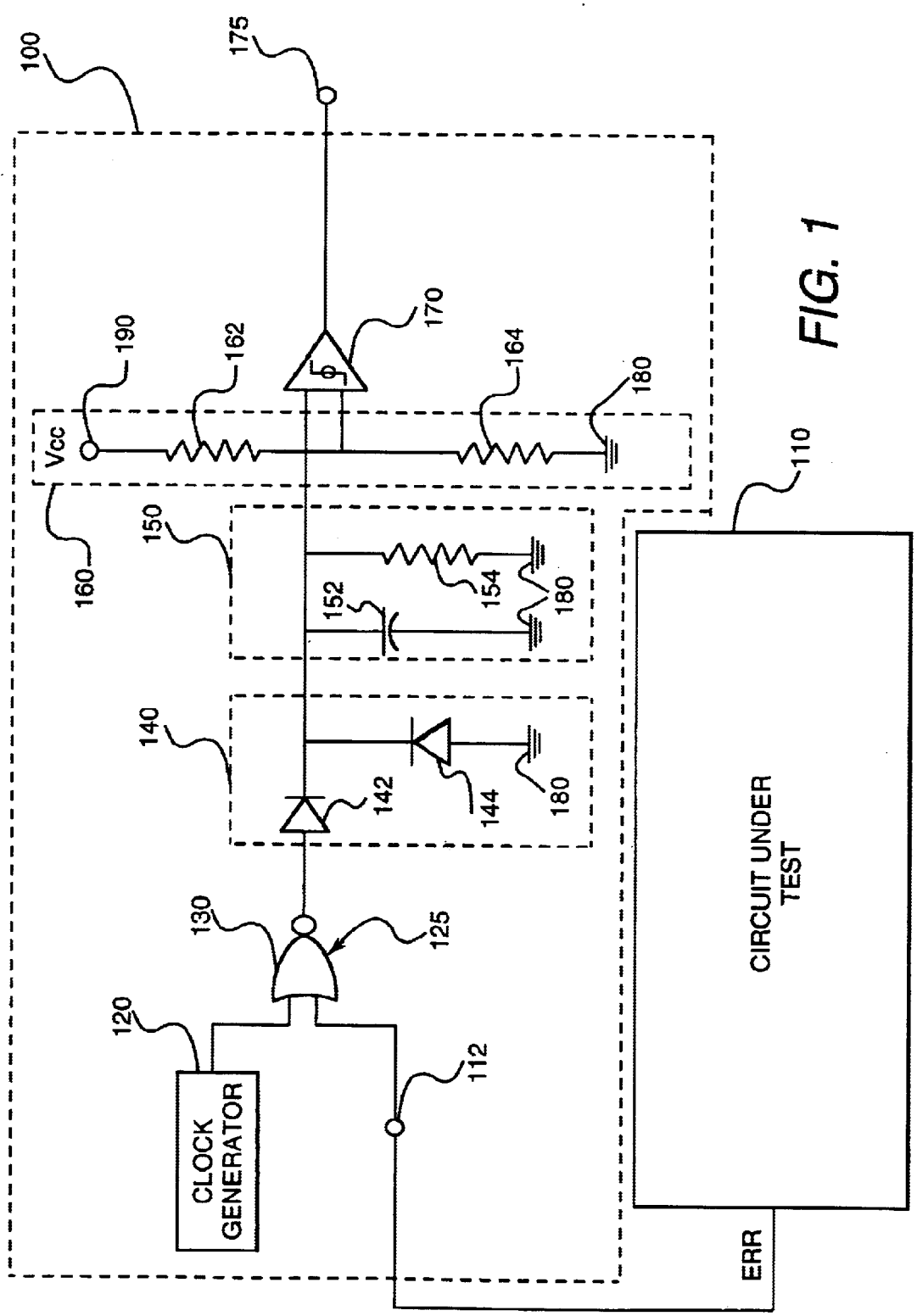
FIG. 1 is a schematic/block diagram of one exemplary embodiment of an on-chip watchdog circuit.
Figure 2:
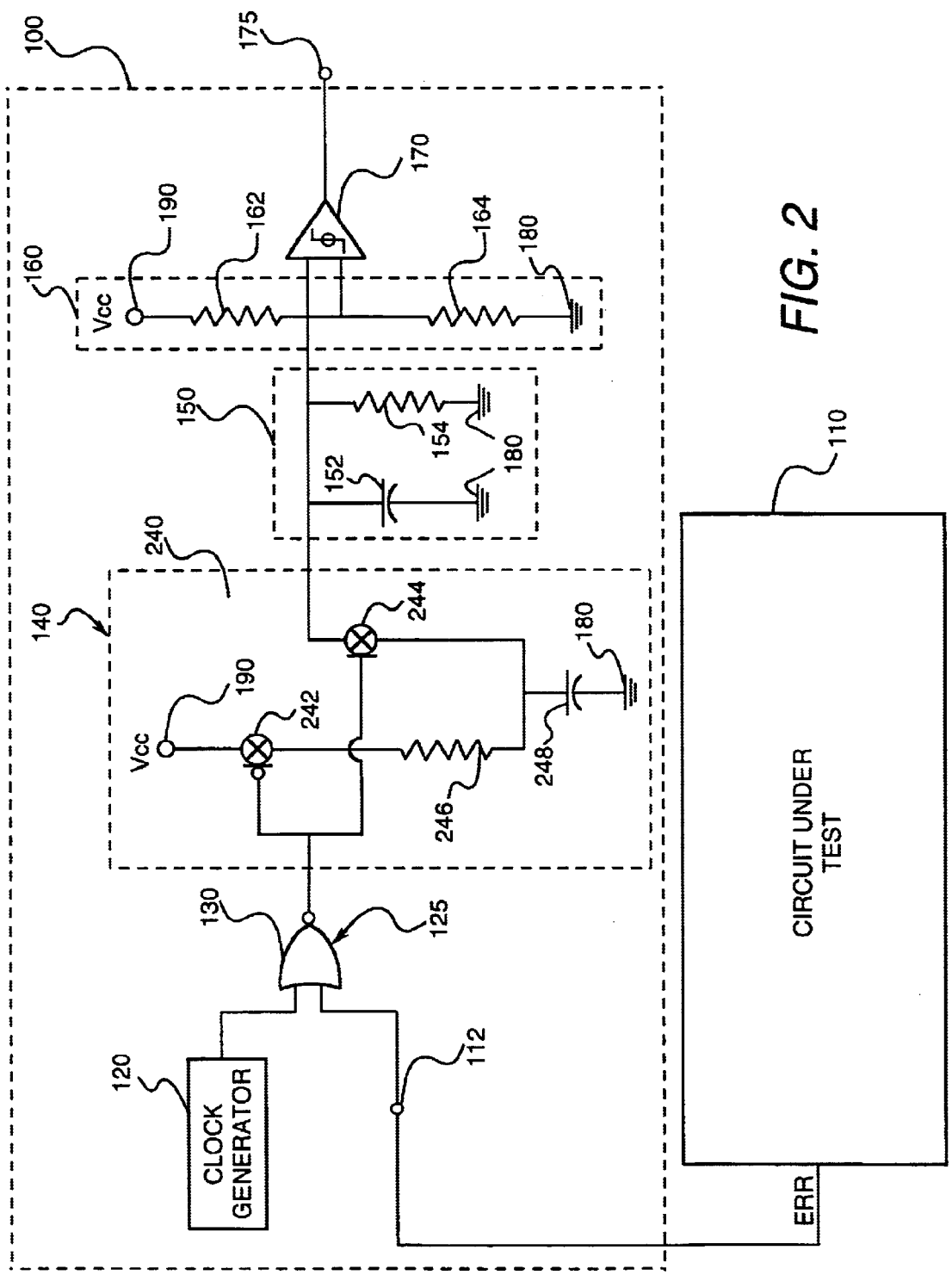
FIG. 2 is a schematic/block diagram of another exemplary embodiment of an on-chip watchdog circuit including a charge pump circuit.

In FIGS. 1 and 2, an on-chip watchdog circuit 100 is connected to a circuit under test 110. In one embodiment, the circuit under test 110 comprises a micro-controller. In another embodiment, the circuit under test 110 comprises a microprocessor. The on-chip watchdog circuit 100 is formed as an integrated circuit, and in one embodiment, the on-chip watchdog circuit 100 is formed on the same semiconductor microchip as the circuit under test 110. The circuit under test 110 comprises at least one self-test function that produces an error signal 112 when the circuit under test 110 fails the self-test function. In one embodiment, the self-test function can comprise, such as, for example, a counter overflow bit, a checksum discrepancy computation bit or other self-testing function. The self-test function is periodically updated, and the circuit under test 110 is re-tested at a predetermined time interval that is termed the error detection and/or self-testing update rate. It should be appreciated that the circuit under test 110 can be tested by the self-test function while the circuit under test 110 performs other operations required, such as, for example, operations performed by a microprocessor and/or a micro-controller in a monitoring or computational application.

In FIG. 1, the on-chip watchdog circuit 100 comprises a clock generator 120 that is connected to an input of a logic gate 125, and the error signal 112 is connected to another input of NOR gate 130. It should be appreciated that the logic gate 125 can receive the error signal 112 or a signal in response to the error signal 112, and in one embodiment, the signal in response to the error signal 112 can comprise the error signal 112, itself or another signal generated in response to the error signal 112. It should be also appreciated that, in these embodiments of FIGS. 1 and 2, the logic gate 125 comprises a NOR gate 130. However, in other embodiments, the logic gate 125 can comprise logic gates other than a NOR gate, such as, for example, an OR gate, an XOR gate, an AND gate or a NAND gate. In another embodiment, the logic gate 125 can comprise a NAND gate (not shown), the use of the NAND gate would use an error signal 112 having a changed polarity, such as, for example an error bar signal (reverse polarity). In one embodiment, the clock generator 120 operates at a predetermined frequency, such as, for example, about five (5) MHz to produce a clock signal to the input of the NOR gate 130. In one embodiment, the clock frequency operates in the range of about 100 kHz to about 10 MHz. In another embodiment, the clock frequency operates at frequencies higher than 10 MHz. An output of the NOR gate 130 is connected to a gate output circuit 140. In one embodiment, the gate output circuit 140 comprises a first diode 142 and a second diode 144. In the configuration of FIG. 1, the first diode 142 and the second diode 144 share cathodes. The anode of the first diode 142 is connected to the output of the NOR gate 130 and the anode of the second diode 144 is connected to ground 180. As shown in FIG. 1, the commonly connected cathodes of the first diode 142 and the second diode 144 are connected to an RC circuit 150. In one embodiment, the RC circuit 150 comprises a capacitor 152 and resistor 154 connected in parallel between the gate output circuit 140 and a comparator 170. In one embodiment, the voltage divider 160 comprises a first resistor 162 connected to a supply voltage $Vs_{cc}$ 190 and a second resistor 164 connected to ground 180. The RC circuit 150 is connected to the comparator 170 via a first input of the comparator 170 and a second input of the comparator 170 is connected to the voltage divider 160. The comparator 170 provides an output signal 175.

It should be appreciated that the on-chip watchdog circuit 100, shown in FIG. 1, is configured for operation with N-well type CMOS devices used in micro-controllers and/or microprocessors. In addition, it should further be appreciated that the on-chip watchdog circuit 100, as shown in FIG. 1, can be used for P-well type CMOS devices. In the P-well type configuration, the first diode 142 and the second diode 144 share anodes. The common anodes of the first diode 142 and the second diode 144 are driven by the output of the NOR gate. Further, in this P-well type configuration, the second diode 144 is not forward biased since the substrate of the second diode 144 is connected to the supply voltage $V_{cc}$ 190. This connection of the second diode 144 avoids a latch-up condition that can be caused by forward biasing. In one embodiment, a latch-up condition is a condition occurs when the parasitic NPNP (SCR) structure associated with a typical CMOS process conducts current often in a fashion destructive to the device. This condition is usually a process type of problem and is avoided by adhering to design layout parameters and reverse biasing of the parasitic diodes such as diode 144. It should also be appreciated that the second diode 144, also termed parasitic diode, is not forward biased in the N-well type configuration, and as such, the second diode 144 does not influence the operation of the on-chip watchdog circuit 100 when the N-well type configuration is used.

In operation, the on-chip watchdog circuit 100, shown in FIG. 1, conducts any charge Q on capacitor 152 through resistor 154 at a rate governed by the time constant of the elements of the RC circuit 150 that includes capacitor 152 and resistor 154. The NOR gate 130 provides a high level at its output when both of its inputs are at a low level. In one embodiment, when the error signal 112 is high and high levels are not present at the output of the NOR gate 130, the voltage at the first inputs of the comparator 170 will fall below and remain below the bias voltage created by the voltage divider 160 at the second input of the comparator 170. As such, an output signal 175 of the comparator 170 will have a low value. In another embodiment, when the error signal 112 is low at the input of the NOR gate 130, the NOR gate 130 passes the clock signals from the clock generator 120. After the clock signals pass through the NOR gate 130, charge is passed to the capacitor 152 at a rate governed by the forward resistance of the first diode 142 and the capacitance of capacitor 152 along with the duty cycle of the clock generator 120. As long as the rate of the charge flowing into the capacitor 152 exceeds the flow of charge through the resistor 154, the voltage at the first inputs of the comparator 170 will increase and is maintained above the bias voltage of the voltage divider at the second input of the comparator 170. As a result, the output signal 175 of the comparator 170 will have a high level. In one embodiment, the output signal 175 can be provided off the semiconductor microchip on which the on-chip watchdog circuit 100 is formed. It should be appreciated that, in one embodiment, the high value can correlated to, for example, a binary high value of "1" and/or a voltage of +5 volts. It should also be appreciated that, in one embodiment, the low value can be correlated to, for example, a binary low value of "0" and/or a voltage of 0 volts.

In FIG. 2, the on-line watchdog circuit 100 comprises a gate output circuit 140 that includes a charge pump circuit 240. The configuration, shown in FIG. 2, that includes the charge pump circuit 240 allows for edge transitions that avoid possible on-chip watchdog circuit 100 failures due to stuck high level faults at the output of the NOR gate 130. It should be appreciated that stuck-at-faults, such as, for example, stuck high faults, can be attributed to point defect errors in the logic gate 125 fabrication. These point defect errors can comprise, for example, crystal defects or open or shorted wires and contacts. The charge pump circuit 240 is connected between the output of the NOR gate 130 and the RC circuit 150. The charge pump circuit 240 comprises a first switch 242 and a second switch 244 connected to the output of the logic gate 130. The first switch 242 is closed and/or conductive at opposite times with reference to the second switch 244. The first switch 242 is connected to power supply $V_{cc}$ and a resistor 246. A pump capacitor 248 is connected between the resistor 246, the second switch 244 and ground 180. The second switch 244 is also connected to the RC circuit 150. It should be appreciated that, in one embodiment, the first switch 242 and the second switch 244 can comprise transistors.

In operation, the on-chip watchdog circuit 100, shown in FIG. 2, supplies charge to the pump capacitor 248 when first switch 242 is closed and/or conductive. The first switch 242 is closed and/or conductive when the output of the NOR gate 130 is at a low level. At this time, the second switch 244 is open to prevent direct charging of the capacitor 152. Thus, the voltage at the first inputs of the comparator 170 will fall below and remain below the bias voltage created by the voltage divider 160 at the second input of the comparator 170. As such, an output signal 175 of the comparator 170 will have a low value. When the state of the NOR gate 130 changes from a low level to a high level, the states of the first switch 242 and the second switch 244 are reversed, and the first switch 242 is open and/or non-conductive and the second switch 244 is closed and/or conductive. While in this state, the charge on the pump capacitor 248 is shared with capacitor 152, and the charge on capacitor 152 is increased or "pumped-up". With a sufficient rate of transition, the charge entering capacitor 152 will be greater than the charge returning to ground 180 through resistor 154. An equilibrium is reached when the voltage achieved across resistor 154 supports a current equal to the rate of charge being "pumped" into capacitor 152. At this time, as long as the rate of the charge flowing into the capacitor 152 exceeds the flow of charge through the resistor 154, the voltage at the first inputs of the comparator 170 will increase and is maintained above the bias voltage of the other comparator 170 input. As a result, the output signal 175 of the comparator 170 will have a high level.

In one embodiment, a "break before make" switching scheme is achieved by providing non-overlapping clocks (not shown) that separately control the first switch 242 and the second switch 244 such that the first switch 242 and the second switch 244 are not closed and/or conductive simultaneously. However, even if non-overlapping clocks (not shown) were not used and the first switch 242 and the second switch 244 were briefly closed and/or conductive at the same time during transitions, the function of periodically recharging the capacitor 152 would still be accomplished. Under these conditions, the resistor 246 is set to limit the charge provided to the capacitor 152 during the overlap period. The setting of the resistor 246 under these conditions offers accurate control of the detection time. In another embodiment of a transition scheme, the error signal 112 becomes a high level and prevents a transition of the first switch 242 and the second switch 244, and charge replacement on the capacitor 152 is prevented until the error signal 112 is reset. In even another embodiment, a level switching scheme is provided where the error signal 112 disables the high level that causes the second switch to be closed and/or conductive and that is required to charge the capacitor 152.

By increasing the frequency of the error detection/self-testing update rates of the circuit under test 110, smaller time constants can be used. The self-testing update rate is, therefore, decoupled from the on-chip watchdog circuit 100 time constant and the on-line watchdog circuit 100 can be set to a time constant that is applied to a wide variety of applications. Thus, in one embodiment, the self-testing functions of the circuit under test will be updated and/or retested at lower time intervals. Smaller time constants affect the RC circuit 150 of the on-chip watchdog circuit 100 by allowing a smaller capacitance value of, at least, capacitor 152. In one embodiment, the capacitance value of capacitor 152 is in the range of about 0.01 picofarads (pF) to about 100 pF. In another embodiment, the capacitance value of capacitor 152 is about 1 pF.

Using capacitance values in the range of about 0.01 pF to about 100 pF, typically, allows the capacitor 152 to be integrated in a moderate amount of silicon area on a semiconductor microchip. As a result, the on-chip watchdog circuit 100 can be integrated on a semiconductor microchip. The integration of the on-chip watchdog circuit 100 reduces costs involved in producing systems using the on-chip watchdog circuit 100. In addition, in another embodiment, the resistor 154, first resistor 162, second resistor 164 and resistor 246 can comprise resistive values ranging from about 50 kilo-ohms (kΩ) to about 1 mega-ohms (MΩ). These resistive values can also be integrated on a semiconductor microchip using a moderate amount of silicon area. As such, to further reduce costs involved in producing systems that include a circuit under test 110 and an on-chip watchdog circuit 100, in one embodiment, both the circuit under test 110 and the on-chip watchdog circuit 100 can be produced on the same semiconductor microchip.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An on-chip watchdog circuit (100) for providing an output signal (175) when an error signal (112) generated by a circuit under test (110) is detected, the on-chip watchdog circuit (100) comprising:
   a logic gate (125) connected to a clock signal, the logic gate (125) to receive a signal in response to the error signal (112) generated by the circuit under test (110);
   a gate output circuit (140) connected to an output of the logic gate (125);
   an RC circuit (150) connected to the gate output circuit (140);
   comparator (170) connected to the RC circuit (150); and
   the comparator (170) connected to the a voltage divider (160) to provide the output signal (175) in response to the error signal (112) generated by the circuit under test (110), and wherein the on-chip watchdog circuit (100) and the circuit under test (110) are integrated on a same semiconductor microchip.

2. The on-chip watchdog circuit (100) of claim 1 wherein the logic gate (125) comprises a NOR gate (130).

3. The on-chip watchdog circuit (100) of claim 1 wherein the logic gate (125) comprises a NAND gate.

4. The on-chip watchdog circuit (100) of claim 1 wherein the RC circuit (150) comprises:
   a capacitor (152) connected to an output of the logic gate (125); and
   a resistor (154) connected in parallel between the capacitor (152) and the comparator (170).

5. The on-chip watchdog circuit (100) of claim 4 wherein the capacitor (152) comprises a capacitance in a range of about 0.01 pF to about 100 pF.

6. The on-chip watchdog circuit (100) of claim 1 wherein the circuit under test (110) comprises a controller.

7. The on-chip watchdog circuit (110) of claim 1 wherein the circuit under test (110) comprises a microprocessor.

8. The on-chip watchdog circuit (110) of claim 1 wherein the gate output circuit (140) comprises at least one diode (142, 144) being connected between an output of the logic gate (125) and the RC circuit (150).

9. The on-chip watchdog circuit (110) of claim 8 wherein the at least one diode (142, 144) comprises:
   a first diode (142) having an first anode and a first cathode, the first anode (144) connected to an output of the logic gate (125); and
   a second diode (144) having a second anode and a second cathode, the second cathode (144) connected to the first cathode and the RC circuit (150), the second anode connected to ground (180).

10. The on-chip watchdog circuit (100) of claim 1 wherein the gate output circuit (140) comprises a charge pump circuit (240).

11. The on-chip watchdog circuit (100) of claim 10 wherein the charge pump circuit (240) comprises:
   a first switch (242) connected to an output of the logic gate (125), a supply voltage (190) and a resistor (246); and
   a second switch (244) connected to the RC circuit (150) and a capacitor (248).

12. The on-chip watchdog circuit (100) of claim 1 wherein a clock signal generator (120) is connected to the logic gate (125) and provides the clock signal.

13. An on-chip watchdog circuit (100) for providing an output signal (175) when an error signal (112) generated by a circuit under test (110) is detected, the on-chip watchdog circuit (100) comprising:
   a clock signal generator (120) to generate a clock signal;
   a NAND gate connected to the clock signal generator (120) to receive the clock signal and a reverse polarity error signal generated by the circuit under test (110), wherein the reverse polarity error signal comprises the error signal (112) having a reverse polarity;
   a gate output circuit (140) connected to an output of the NAND gate;
   a capacitor (152) connected between the gate output circuit (140) and ground (180);
   a resistor (154) connected between the capacitor (152) and ground (180);
   a comparator (170) connected to the resistor (154); and
   the comparator (170) connected to a voltage divider (160), the comparator (170) to provide the output signal (175) in response the error signal (112) generated by the circuit under test (110), and wherein the on-chip watchdog circuit (100) and the circuit under test (110) are integrated on a same semiconductor microchip.

14. An on-chip watchdog circuit (100) for providing an output signal (175) when an error signal (112) generated by a circuit under test (110) is detected, the on-chip watchdog circuit (100) comprising:

a clock signal generator (120) to generate a clock signal;

a NOR gate (130) connected to the clock signal generator (120) to receive the clock signal and the error signal (112) generated by the circuit under test (110);

a gate output circuit (140) connected to an output of the NOR gate (130);

a capacitor (152) connected between the gate output circuit (140) and ground (180);

a resistor (154) connected between the capacitor (152) and ground (180);

a comparator (170) connected to the resistor (154); and the comparator (170) connected to a voltage divider (160), the comparator (170) to provide the output signal (175) in response the error signal (112) generated by the circuit under test (110), and wherein the on-chip watchdog circuit (100) and the circuit under test (110) are integrated on a same semiconductor microchip.

15. The on-chip watchdog circuit (100) of claim 14 wherein the capacitor (152) comprises a capacitance value in a range of about 0.01 pF to about 100 pF.

16. The on-chip watchdog circuit (100) of claim 14 wherein the circuit under test (110) comprises a controller.

17. The on-chip watchdog circuit (100) of claim 14 wherein the circuit under test (110) comprises a microprocessor.

18. The on-chip watchdog circuit (100) of claim 14 wherein the gate output circuit (140) comprises at least one diode (142, 144) being connected between an output of the NOR gate (130) and the RC circuit (150).

19. The on-chip watchdog circuit (100) of claim 18 wherein the at least one diode (142, 144) comprises:

a first diode (142) having a first anode and a first cathode, the first anode (142) connected to an output of the NOR gate (130); and a second diode (144) having a second anode and a second cathode, the second cathode connected to the first cathode and the RC circuit (150), the second anode connected to ground (180).

20. The on-chip watchdog circuit (100) of claim 18 wherein the at least one diode (142, 144) comprises:

a first diode (142) having a first anode connected to an output of the NOR gate (130); and a second diode (144) having a second anode connected to the first anode and the output of the NOR gate (130), the second diode (144) also connected to a supply voltage (190).

21. The on-chip watchdog circuit (100) of claim 14 wherein the gate output circuit (140) comprises a charge pump circuit (240).

22. The on-chip watchdog circuit (100) of claim 21 wherein the charge pump circuit (240) comprises:

a first switch (242) connected to an output of the NOR gate (230), a supply voltage (190) and a resistor (246); and a second switch (244) connected to the RC circuit (150) and a capacitor (248).

* * * * *